united States Patent Office 3,053,772
Patented Sept. 11, 1962

3,053,772
RED LUMINESCENT MATERIAL FOR CATHODE-RAY TUBES
Michael Avinor, Haifa, Israel, assignor to North American Philips Company, Inc., New York, N.Y., a corporation of Delaware
No Drawing. Filed Feb. 24, 1961, Ser. No. 91,329
Claims priority, application Netherlands Mar. 2, 1960
2 Claims. (Cl. 252—301.6)

This invention relates to a red luminescent material with a decay time of the luminescence less than $2 \cdot 10^{-6}$ sec.

In cathode-ray tubes for use in flying spot scanners, that is to say in devices in which lantern slides or films are scanned for the transmission of television signals, it is necessary for the luminescence of the materials in the screen to have a decay time (that is to say the time in which the intensity of the emitted radiation decreases to half the value when the excitation ceases) which is less than $2 \cdot 10^{-6}$ sec. A number of substances are known which satisfy this requirement and which also have a reasonable light output when excited by electrons. One of the substances commonly employed is zinc-oxide which emits green light when excited by electrons. Also known is the so-called gehlenite, that is a calcium-aluminum silicate activated with cerium, which emits blue light when excited by electrons.

It is desirable to increase the number of substances serviceable for flying-spot scanners and more particularly such substances are desirable to emit light at comparatively long wavelengths, for example orange to red. In fact, in this case such devices can also satisfactorily be used for colour-television transmission.

A red luminescent material according to the invention has a decay time of the luminescence less than $2 \cdot 10^{-6}$ sec. and is mixed sulphides of cadmium and at least one of the elements calcium and strontium, activated with trivalent antimony, wherein the ratio between the number of cadmium atoms and the sum of the numbers of calcium atoms and strontium atoms lies between $5 \cdot 10^{-3}$ and $10^{-1}$ and the ratio between the number of antimony atoms and the sum of the numbers of atoms of calcium, strontium and cadmium lies between $10^{-5}$ and $10^{-2}$.

The limits for the ratio between the cadmium and the sum of the calcium and the strontium are determined by the fact that the decay time becomes too long below the lower limit and that the light output materially decreases above the higher limit.

With respect to antimony activated sulphides or strontium and calcium alone, the incorporation of cadmium has the advantage that the luminescence takes place at longer wave-lengths, namely at maximum values between about 570 m$\mu$ and 650 m$\mu$ and that the decay time of the luminescence is shorter.

The luminescent materials according to the invention may be manufactured in a manner as is usual for sulphides of calcium or magnesium, an example of which follows.

*Example*

A mixture is prepared of 300 g. $CaSO_4.2H_2O$
14 g. CdS, and
0.13 g. $Sb_2O_3$

This mixture is fired for 1 hour at 950° C. in a reducing $H_2S$-atmosphere. After cooling the resulting product is ground, mixed with 50 mg. $CaF_2$ as a flux and fired again for ½ hour in an $H_2S$-atmosphere at a temperature of 1100° C. The resulting mass is ground again after cooling and fired for another ½ hour at a temperature of 1100° C. in an $H_2S$-atmosphere. The final reaction product is then powdered and ready for use, e.g. in the screen of flying-spot scanner tubes and luminesces red under electron-bombardment.

What is claimed is:
1. A red luminescent material suitable for use in cathode-ray tubes and having a decay tme of luminescence less than $2 \cdot 10^{-6}$ sec., said luminescent material being a mixed sulphide of cadmium and at least one bivalent element selected from the group consisting of calcium and strontium, activated with trivalent antimony, wherein the ratio between the number of cadmium atoms and the sum of the numbers of calcium atoms and strontium atoms lies between $5 \cdot 10^{-3}$ and $10^{-1}$ and the ratio between the number of antimony atoms and the sum of the numbers of atoms of calcium, strontium and cadmium lies between $10^{-5}$ and $10^{-2}$.
2. The red luminescent material of claim 1 wherein the bivalent element is calcium.

References Cited in the file of this patent
FOREIGN PATENTS
574,321    Great Britain _____ Jan. 1, 1946
OTHER REFERENCES
Kröger: "Some Aspects of the Luminescence of Solids," Elsevier Publ. Co. Inc., N.Y., page 278.